United States Patent
Wang (10) Patent No.: US 10,747,961 B2
(45) Date of Patent: Aug. 18, 2020

(54) METHOD AND DEVICE FOR IDENTIFYING A SENTENCE

(71) Applicant: BOE Technology Group Co., Ltd., Beijing (CN)

(72) Inventor: Xiang Wang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 128 days.

(21) Appl. No.: 16/015,299

(22) Filed: Jun. 22, 2018

(65) Prior Publication Data

US 2019/0057084 A1 Feb. 21, 2019

(30) Foreign Application Priority Data

Aug. 16, 2017 (CN) .......................... 2017 1 0703355

(51) Int. Cl.
| | |
|---|---|
| *G06N 3/04* | (2006.01) |
| *G06F 40/40* | (2020.01) |
| *G06F 16/9032* | (2019.01) |
| *G06F 40/30* | (2020.01) |
| *G06N 3/00* | (2006.01) |

(52) U.S. Cl.
CPC ........ *G06F 40/40* (2020.01); *G06F 16/90332* (2019.01); *G06F 40/30* (2020.01); *G06N 3/04* (2013.01); *G06N 3/0454* (2013.01); *G06N 3/006* (2013.01)

(58) Field of Classification Search
CPC .............................. G06F 17/28; G06N 3/0454
USPC ........................................................... 704/9
See application file for complete search history.

(56) References Cited

U.S. PATENT DOCUMENTS

| | | | | |
|---|---|---|---|---|
| 9,847,974 | B2 * | 12/2017 | Kompalli | G06K 9/00442 |
| 10,007,863 | B1 * | 6/2018 | Pereira | G06K 9/4671 |
| 10,360,303 | B2 * | 7/2019 | Volkovs | G06F 40/30 |
| 10,489,680 | B2 * | 11/2019 | Aliabadi | G06N 3/084 |
| 10,606,949 | B2 * | 3/2020 | Zhu | G06N 3/0454 |
| 2017/0103302 | A1 | 4/2017 | Henry et al. | |

FOREIGN PATENT DOCUMENTS

CN 106570148 A 4/2017

OTHER PUBLICATIONS

Office Action issued in corresponding Chinese Patent Application No. 201710703355.0, dated Mar. 4, 2020.

* cited by examiner

*Primary Examiner* — Susan I McFadden
(74) *Attorney, Agent, or Firm* — McDermott Will & Emery LLP (57) ABSTRACT

The present disclosure discloses a method and device for identifying information. The method for identifying information includes acquiring a word vector matrix of the information; for each of a plurality of convolutional kernel widths of a convolutional neural network, convolving each convolutional kernel corresponding to the width with the word vector matrix of the information to acquire a convolutional vector corresponding to each convolutional kernel, and performing a maximum pooling operation on each convolutional vector to acquire an identification feature corresponding to the width; combining identification features corresponding to various convolutional kernel widths to acquire an identification feature of the information; and identifying the information according to similarity of the identification feature of the information.

10 Claims, 3 Drawing Sheets

METHOD AND DEVICE FOR IDENTIFYING A SENTENCE

CROSS-REFERENCE TO RELATED APPLICATION(S)

This application claims priority to the Chinese Patent Application No. 201710703355.0, filed on Aug. 16, 2017, which is incorporated herein by reference in its entirety.

TECHNICAL FIELD

The present disclosure relates to the field of computer processing technology, and more particularly, to a method and device for identifying information.

BACKGROUND

Semantic identification is also referred to as question and answer semantic identification, which primarily aims to analyze and judge sentences (usually question sentences) given by a user, and finally determine the user's intentions. The semantic identification is the premise to answer users' questions, and is mainly applied in customer service robots, question answering systems, and man-machine interactive systems etc.

For example, in an operating system of a customer service robot, when a user transmits his/her own question sentence to the system, the customer service robot may analyze and judge the transmitted sentence to determine meanings of the sentence, and then determine the user's intentions. Finally, the customer service robot may give a series of answers which are considered to be correct by itself.

The semantic identification methods in the related art are mainly used to segment a sentence to be identified into words using word segmentation techniques such as character matching methods, comprehension methods, statistical methods etc., and then extract semantic features according to word levels. However, the above general word segmentation methods tend to produce ambiguity in certain words in the sentence to be identified, and cannot achieve a good accuracy of word segmentation, thereby resulting in a low accuracy of semantic identification.

SUMMARY

According to an aspect of the present disclosure, there is proposed a method for identifying information, comprising: acquiring a word vector matrix of the information; for each of a plurality of convolutional kernel widths of a convolutional neural network, convolving each convolutional kernel corresponding to the width with the word vector matrix of the information to acquire a convolutional vector corresponding to each convolutional kernel, and performing a maximum pooling operation on each convolutional vector to acquire an identification feature corresponding to the width; combining identification features corresponding to various convolutional kernel widths to acquire an identification feature of the information; and identifying the information according to similarity of the identification feature of the information.

In an embodiment, different convolutional kernel widths correspond to different numbers of convolutional kernels.

In an embodiment, a smaller one of any two convolutional kernel widths corresponds to a larger number of convolutional kernels.

In an embodiment, combining identification features corresponding to various convolutional kernel widths to acquire an identification feature of the information comprises: arranging and combining the identification features corresponding to various convolutional kernel widths to acquire one-dimensional identification features.

In an embodiment, the similarity of the identification feature of the information comprises first similarity between target information and positive sample information and second similarity between the target information and negative sample information.

In an embodiment, identifying the information according to similarity of the identification feature of the information comprises: determining a loss value according to the first similarity and the second similarity; and determining whether convolutional neural network parameters in the convolutional neural network need to be adjusted according to the loss value, wherein a domain to which the positive sample information belongs is the same as a domain to which the target information belongs, and a domain to which the negative sample information belongs is the same as or different from the domain to which the target information belongs.

According to another aspect of the present disclosure, there is proposed a device for identifying information, comprising: at least one processing unit; and at least one storage unit connected to the at least one processing unit, wherein the storage unit has program codes stored thereon, which when being executed by the processing unit, cause the processing unit to: acquire a word vector matrix of the information; for each of a plurality of convolutional kernel widths of a convolutional neural network, convolve each convolutional kernel corresponding to the width with the word vector matrix of the information to acquire a convolutional vector corresponding to each convolutional kernel, and perform a maximum pooling operation on each convolutional vector to acquire an identification feature corresponding to the width; combine identification features corresponding to various convolutional kernel widths to acquire an identification feature of the information; and identify the information according to similarity of the identification feature of the information.

In an embodiment, different convolutional kernel widths correspond to different numbers of convolutional kernels.

In an embodiment, a smaller one of any two convolutional kernel widths corresponds to a larger number of convolutional kernels.

In an embodiment, the processing unit is further configured to: arrange and combine the identification features corresponding to various convolutional kernel widths to acquire one-dimensional identification features.

In an embodiment, the similarity of the identification feature of the information comprises first similarity between target information and positive sample information and second similarity between the target information and negative sample information.

In an embodiment, the processing unit is further configured to:

determine a loss value according to the first similarity and the second similarity; and determine whether convolutional neural network parameters in the convolutional neural network need to be adjusted according to the loss value, wherein a domain to which the positive sample information belongs is the same as a domain to which the target information belongs, and a domain to which the negative sample information belongs is the same as or different from the domain to which the target information belongs.

According to yet another aspect of the present disclosure, there is proposed a device for identifying information, comprising: a matrix determination unit configured to acquire a word vector matrix of the information; a convolution operation unit configured to, for each of a plurality of convolutional kernel widths of a convolutional neural network, convolve each convolutional kernel corresponding to the width with the word vector matrix of the information to acquire a convolutional vector corresponding to each convolutional kernel, and perform a maximum pooling operation on each convolutional vector to acquire an identification feature corresponding to the width; a feature combination unit configured to combine identification features corresponding to various convolutional kernel widths to acquire an identification feature of the information; and a processing unit configured to identify the information according to similarity of the identification feature of the information.

It is understood that other embodiments and configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

In order to more clearly explain the technical solutions in the embodiments of the present disclosure, the accompanying drawings need to be used in the description of the embodiments will be briefly described below. Obviously, the accompanying drawings in the following description are merely some embodiments of the present disclosure. Those skilled in the art can also acquire other accompanying drawings based on these accompanying drawings without any creative work.

DETAILED DESCRIPTION

In order to make the purposes, technical solutions, and advantages of the present disclosure more clear, the present disclosure will be further described in detail below with reference to the accompanying drawings. Obviously, the embodiments described are merely some but not all of the embodiments of the present disclosure. All other embodiments acquired by those of ordinary skill in the art based on the embodiments of the present disclosure without any creative work shall fall within the protection scope of the present disclosure.

In the embodiments of the present disclosure, a plurality of convolutional kernels corresponding to each of a plurality of convolutional kernel widths of a convolutional neural network are convolved with a word vector matrix of information respectively, a maximum pooling operation is performed on the resulting convolutional vector corresponding to each convolutional kernel to acquire an identification feature corresponding to the convolutional kernel width, identification features corresponding to various convolutional kernel widths are combined to acquire an identification feature of the information, and the information is identified according to similarity of the identification feature of the information. As in the embodiments of the present disclosure, a plurality of convolutional kernels corresponding to each of a plurality of convolutional kernel widths of a convolutional neural network are convolved with a word vector matrix of information respectively and the resulting identification features corresponding to various widths are combined, sentence keywords of different lengths (i.e., identification features) can be effectively extracted, and the plurality of identification features can be combined with each other for semantic identification, thereby reducing the influence of words which are likely to cause ambiguous in sentences on the semantic identification, and improving the accuracy of the semantic identification.

Figure 1:
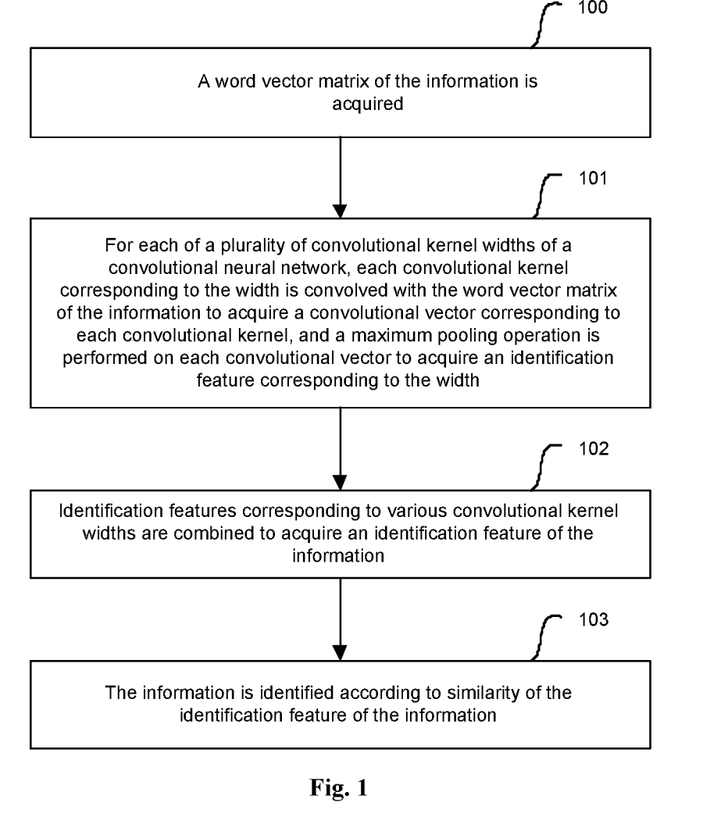
FIG. 1 is a schematic flowchart of a method for identifying information according to an embodiment of the present disclosure.

As shown in FIG. 1, a method for identifying information according to an embodiment of the present disclosure comprises the following steps.

In step 100, a word vector matrix of the information is acquired.

In step 101, for each of a plurality of convolutional kernel widths of a convolutional neural network, each convolutional kernel corresponding to the width is convolved with the word vector matrix of the information to acquire a convolutional vector corresponding to each convolutional kernel, and a maximum pooling operation is performed on each convolutional vector to acquire an identification feature corresponding to the width.

In step 102, identification features corresponding to various convolutional kernel widths are combined to acquire an identification feature of the information.

In step 103, the information is identified according to similarity of the identification feature of the information.

In the embodiments of the present disclosure, a plurality of convolutional kernels corresponding to each of a plurality of convolutional kernel widths of a convolutional neural network are convolved with a word vector matrix of information respectively, a maximum pooling operation is performed on the resulting convolutional vector corresponding to each convolutional kernel to acquire an identification feature corresponding to the width, identification features corresponding to various widths are combined to acquire an identification feature of the information, and the information is identified according to similarity of the identification feature of the information. As in the embodiments of the present disclosure, a plurality of convolutional kernels corresponding to each of a plurality of convolutional kernel widths of a convolutional neural network are convolved with a word vector matrix of information respectively and the resulting identification features corresponding to various widths are combined, sentence keywords of different lengths (i.e., identification features) can be effectively extracted, and the plurality of identification features can be combined with each other for semantic identification, thereby reducing the influence of words which are likely to cause ambiguous in sentences on the semantic identification, and improving the accuracy of the semantic identification.

The information according to the embodiments of the present disclosure may be any information including words, such as an acquired sentence spoken by a use, or a sentence included in a sample database etc.

Identification feature of each piece of information may be acquired through the solutions according to the embodiments of the present disclosure. For example, a sentence spoken by a user is acquired, the acquired sentence needs to be compared with sentences in a sample database, and a sentence similar to the acquired sentence is found from the sample database. At this time, an identification feature of the acquired sentence may be determined through the solutions according to the embodiments of the present disclosure, an identification feature of each sentence in the sample database may be determined, the identification feature of the acquired sentence may be compared with identification features of various sentences in the sample database respectively, to determine similarity between the identification feature of the acquired sentence and the identification features of various sentences in the sample database, and a sentence similar to the acquired sentence is found from the sample database through the similarity.

How to acquire the identification feature of each piece of information will be specifically described in detail below.

In an implementation, a word vector matrix of the information needs to be acquired.

Specifically, each word in the information is converted into a word vector through an embedding layer and a word vector matrix is composed of all the word vectors.

Word vectors of various words have the same length. A length of a word vector may be specifically set according to experiences, demands, etc.

For example, if information to be identified is "我爱中国", a length of the information is 4, and a length of a word vector is set to 5, the converted word vectors may be as follows:

"我": [0.8, 0.3, −0.5, 0.01, 0.12],

"爱": [−0.1, 0.6, 0.2, −0.13, 0.3],

"中": [−0.05, 0.1, 0.3, 0.4, −0.3], and

"国": [0.03, 0.08, 0.6, 0.3, −0.2].

A word vector matrix composed of the word vectors corresponding to "我爱中国" is:

$$\begin{vmatrix} 0.8 & 0.3 & -0.5 & 0.01 & 0.12 \\ -0.1 & 0.6 & 0.2 & -0.13 & 0.3 \\ -0.05 & 0.1 & 0.3 & 0.4 & -0.3 \\ 0.03 & 0.08 & 0.6 & 0.3 & -0.2 \end{vmatrix}.$$

In an embodiment, after the word vector matrix of the information is acquired, each convolutional kernel corresponding to each of a plurality of convolutional kernel widths may be convolved with the word vector matrix.

In the embodiments of the present disclosure, a plurality of different convolutional kernel widths may be set in the convolutional neural network. Here, it needs to convolve the word vector matrix of the information according to each convolutional kernel width.

The convolutional kernel widths in the convolutional neural network may be set according to experiences, model training, etc. For example, if the information is Chinese, semantics including one Chinese word, two Chinese words, three Chinese words, and four Chinese words generally account for the vast majority, and therefore the convolutional kernel widths may be set to [1, 2, 3, 4].

It is assumed that the set convolutional kernel widths are [1, 2, 3, 4], and a specific approach is as follows.

Firstly, each convolutional kernel corresponding to a convolutional kernel width of 1 is determined, and then each determined convolutional kernel is convolved with the word vector matrix of the information.

For example, if the convolutional kernel width of 1 corresponds to a convolutional kernel A1, a convolutional kernel A2, and a convolutional kernel A3, the convolutional kernel A1 is convolved with the word vector matrix of the information to acquire a convolutional vector corresponding to the convolutional kernel A1; the convolutional kernel A2 is convolved with the word vector matrix of the information to acquire a convolutional vector corresponding to the convolutional kernel A2; and the convolutional kernel A3 is convolved with the word vector matrix of the information to acquire a convolutional vector corresponding to the convolutional kernel A3.

As the convolutional kernel width of 1 corresponds to 3 convolutional kernels, 3 convolutional vectors may be acquired. Then, a maximum pooling operation may be performed on each convolutional vector, i.e., selecting the largest value in each convolutional vector.

Here, the maximum pooling operation may be performed after convolutional vectors corresponding to convolutional kernels for all convolutional kernel widths are acquired, or the maximum pooling operation may be performed each time a convolutional vector is acquired.

Convolutional vectors corresponding to various convolutional kernels with a convolutional kernel width of 2 continue to be acquired in the above manner, and so on, until the convolutional vectors corresponding to various convolutional kernels for all the widths are acquired.

Here, a length of a convolutional vector corresponding to a convolutional kernel (that is, a number of values included in the convolutional vector) is related to a number of words included in the information and a convolutional kernel width.

For example, when the convolutional kernel width is 1, a corresponding convolutional kernel is A1, and a sentence is "我爱中国", a number of columns of a corresponding word vector matrix is 4. When the convolutional kernel A1 is convolved with columns of the word vector matrix, as the width is 1, the convolutional kernel A1 is firstly convolved with a first column to acquire a value, and is then convolved with a second column to acquire a value, and so on. Finally, four values are acquired to form a convolutional vector of the convolutional kernel A1 corresponding to the width of 1.

For example, when the convolutional kernel width is 2, a corresponding convolutional kernel is A1, and a sentence is "我爱中国", a number of columns of a corresponding word vector matrix is 4. When the convolutional kernel A1 is convolved with columns of the word vector matrix, as the width is 2, the convolutional kernel A1 is firstly convolved with a first column and a second column to acquire a value, is then convolved with the second column and a third column to acquire a value, and is then convolved with the third column and a fourth column to acquire a value. Finally, three values are acquired to form a convolutional vector of the convolutional kernel A1 corresponding to the width of 2.

Based on the above contents, a length of a convolutional vector corresponding to a convolutional kernel may be determined by the following equation: the length of the convolutional vector=a length of a sentence−a convolutional kernel width+1.

Here, after the maximum pooling operation is performed on the convolutional vectors, the largest value in each convolutional vector is acquired. For example, when a width of X corresponds to N1 convolutional kernels, a convolutional vector corresponding to each convolutional kernel may be acquired, and therefore N1 values may be acquired. After the N1 values are acquired, the N1 values are combined together to acquire an identification feature for the width of X.

For example, there are 3 convolutional kernels corresponding to a width of 1, and three values acquired after the maximum pooling operation is performed are A1, A2, and A3. These three values are combined together to acquire an identification feature for the width of 1, i.e., (A1, A2, A3).

In an embodiment, different convolutional kernel widths correspond to different numbers of convolutional kernels.

For example, in the convolutional neural network, a number of convolutional kernels corresponding to a convolutional kernel width of 1 is N, and a number of convolutional kernels corresponding to a width of 2 is M, wherein N is different from M.

Here, the number of convolutional kernels may be determined according to accuracy of a algorithm with respect to a training set and a test set of a database.

As different widths correspond to different numbers of convolutional kernels, an identification feature of information in a target domain can be effectively extracted, and overfitting of models due to too many convolutional kernels is prevented.

In an implementation, a smaller one of any two convolutional kernel widths corresponds to a larger number of convolutional kernels.

For example, a number of convolutional kernels corresponding to a width of 2 is 20, and a number of convolutional kernels corresponding to a convolutional kernel width of 3 in the convolutional neural network is 10.

As a convolutional kernel with a small width contains a part of an identification feature of a convolutional kernel with a large width, and the convolutional kernel with a large width requires more parameters, in implementations, a number of convolutional kernels corresponding to a small width is set to be greater than a number of convolutional kernels corresponding to a large width. In this way, an identification feature of information in a target domain can be effectively extracted, and overfitting of models due to too many convolutional kernels is prevented.

In an embodiment, when the identification features corresponding to various convolutional kernel widths are combined to acquire an identification feature of the information in the embodiment of the present disclosure, the identification features corresponding to various convolutional kernel widths are arranged and combined to acquire one-dimensional identification features.

For example, a number of convolutional kernels corresponding to a width of 1 is 30. After any convolutional kernel is convolved with the word vector of the information and a maximum pooling operation is performed, 30 values (X1, X2, . . . , X30), i.e. an identification feature with a length of 30, are acquired.

A number of convolutional kernels corresponding to a width of 2 is 20. After any convolutional kernel is convolved with the word vector of the information and a maximum pooling operation is performed, 20 values (Y1, Y2, . . . , Y20), i.e. an identification feature with a length of 20, are acquired.

The 30 values corresponding to the width of 1 and the 20 values corresponding to the width of 2 are arranged and combined, wherein the values may be arranged in a manner of for example, firstly arranging identification features for the width of 1, or firstly arranging identification features for the width of 2, or interspersing the identification features. After the arrangement is performed, a one-dimensional group of identification features is acquired.

For example, if the identification features for the width of 1 are firstly arranged, the one-dimensional group of identification features is (X1, X2 . . . X30, Y1, Y2 . . . Y20).

For example, if the identification features for the width of 2 are firstly arranged, the one-dimensional group of identification features is (Y1, Y2, Y3, Y20, X1, X2, . . . , X30).

As the one-dimensional identification features are acquired, the degree of difficulty in calculation of similarity is reduced.

In an implementation, in the embodiment of the present disclosure, training may further be continuously performed in practical applications, thereby further improving the accuracy of identification.

In an embodiment, the similarity of the identification feature of the information comprises first similarity between target information and positive sample information and second similarity between the target information and negative sample information.

Identifying the information according to similarity of the identification feature of the information comprises: determining a loss value according to the first similarity and the second similarity; and determining whether convolutional neural network parameters in the convolutional neural network need to be adjusted according to the loss value.

In an embodiment, a domain to which the positive sample information belongs is the same as a domain to which the target information belongs, and a domain to which the negative sample information belongs is the same as or different from the domain to which the target information belongs.

In an implementation, in the embodiments of the present disclosure, there may be a plurality of domains which are divided according to the contents of the information, for example, a mechanical domain, a chemical domain, an electronic domain, a communication domain, etc.

The above domains are just by way of examples, and each domain may further be refined. An example of division of academic domains is described above, and there may also be division of other domains, for example, a legal domain, a financial domain, etc.

In an implementation, an intent library including all the information required to be compared may be established, and may be divided according to domains to which the information belongs.

During comparison, information in the intent library may be divided into information belonging to the same domain as that to which target information (i.e., acquired information) belongs, and information belonging to a domain different from that to which the target information belongs.

Here, the information belonging to the same domain as that to which target information belongs may further be divided into questions with other tags and questions without other tags. The questions with other tags here mainly refer to questions with ambiguity in the domain to which the information belongs.

The information belonging to a domain different from that to which the target information belongs is domain-independent information which is collected in the practical applications.

The positive sample information according to the embodiment of the present disclosure comprises information which belongs to the same domain as that to which the target information belongs and does not have other tags.

The negative sample information according to the embodiment of the present disclosure comprises information which belongs to the same domain as that to which the target information belongs and has other tags, and information belonging to a domain different from that to which the target information belongs.

In an embodiment, a loss value may be determined by the following loss function equation:

$$Loss = \max\{0, m-(s-s')\}$$

where Loss is a loss function value, m is a margin, s is a first similarity degree, and s' is a second similarity degree.

The loss value is used to adjust convolutional parameters in the convolutional neural network. The convolutional neural network parameters in the convolutional neural network are related to the margin m, and a difference between the first similarity and the second similarity.

When the difference is greater than the margin m, the loss value is 0. In this case, there is no need to adjust the convolutional neural network parameters. When the difference is less than the margin m, the loss value is m−(s−s'), and thus a loss is not 0. In this case, the convolutional neural network parameters need to be adjusted.

The convolutional neural network parameters which may be adjusted in the embodiments of the present disclosure comprise, but not limited to, some or all of the following parameters: a word vector parameter and a convolutional kernel parameter, wherein the convolutional kernel parameter comprises a convolutional kernel weight parameter and a convolutional kernel bias.

Determination of the identification feature of the information according to the present disclosure will be described in detail below.

Figure 2:
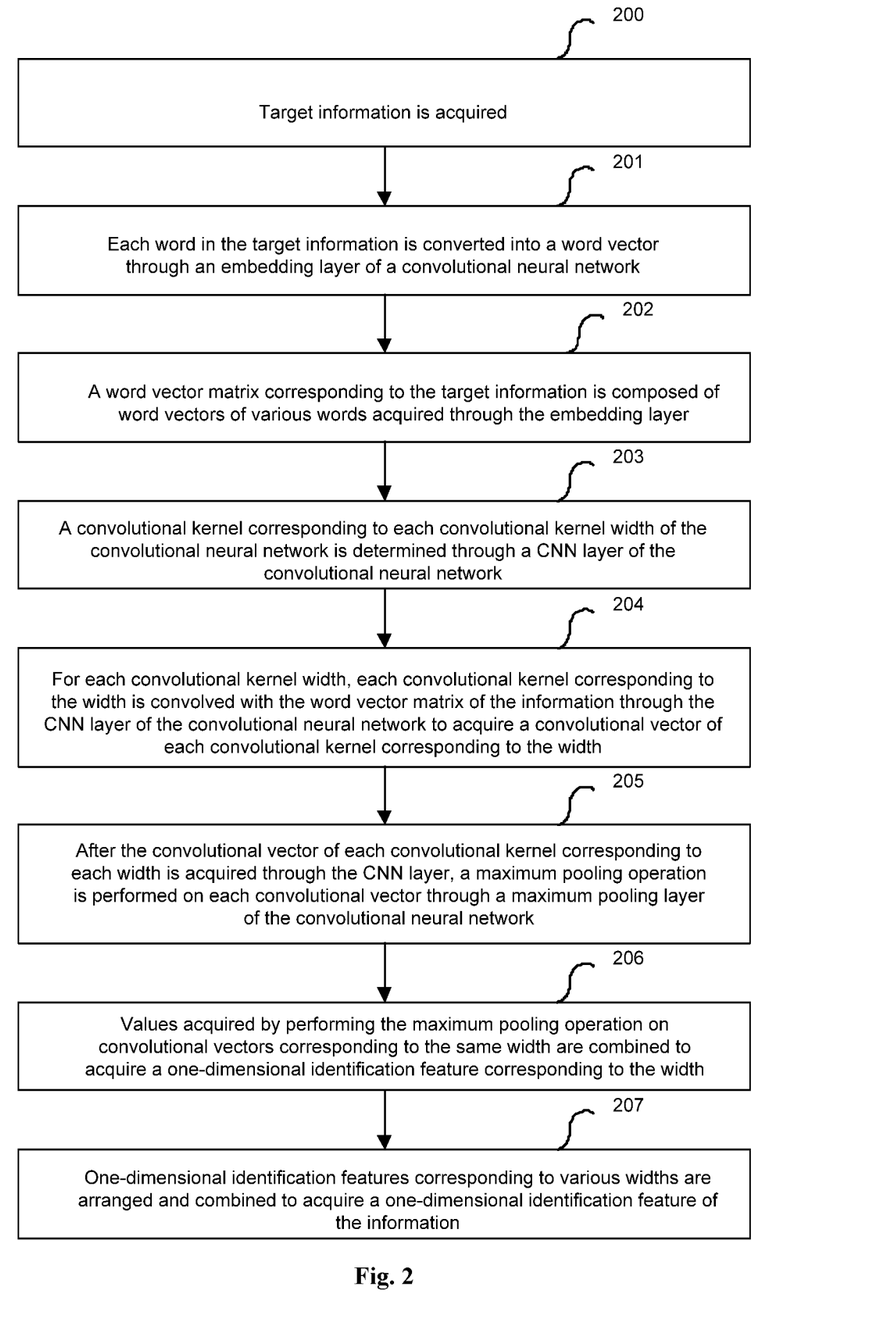
FIG. 2 is a schematic flowchart of determining an identification feature of information according to an embodiment of the present disclosure.

As shown in FIG. 2, determining an identification feature of information according to an embodiment of the present disclosure comprises the following steps.

In step 200, target information is acquired.

In step 201, each word in the target information is converted into a word vector through an embedding layer of a convolutional neural network.

In step 202, a word vector matrix corresponding to the target information is composed of word vectors of various words acquired through the embedding layer.

In step 203, a convolutional kernel corresponding to each convolutional kernel width of the convolutional neural network is determined through a CNN layer of the convolutional neural network.

In step 204, for each convolutional kernel width, each convolutional kernel corresponding to the width is convolved with the word vector matrix of the information through the CNN layer of the convolutional neural network to acquire a convolutional vector of each convolutional kernel corresponding to the width.

In step 205, after the convolutional vector of each convolutional kernel corresponding to each width is acquired through the CNN layer, a maximum pooling operation is performed on each convolutional vector through a maximum pooling layer of the convolutional neural network.

In step 206, values acquired by performing the maximum pooling operation on convolutional vectors corresponding to the same width are combined to acquire a one-dimensional identification feature corresponding to the width.

In step 207, one-dimensional identification features corresponding to various widths are arranged and combined to acquire a one-dimensional identification feature of the information.

Based on the same concept of the present disclosure, the embodiments of the present disclosure further provide a device for identifying information. As the device is a device corresponding to the method for identifying information according to the embodiments of the present disclosure, and the principle of the device to solve problems is similar to that of the method, the implementations of the device can be known with reference to the implementations of the method, and the repeated parts will not be described.

Figure 3:
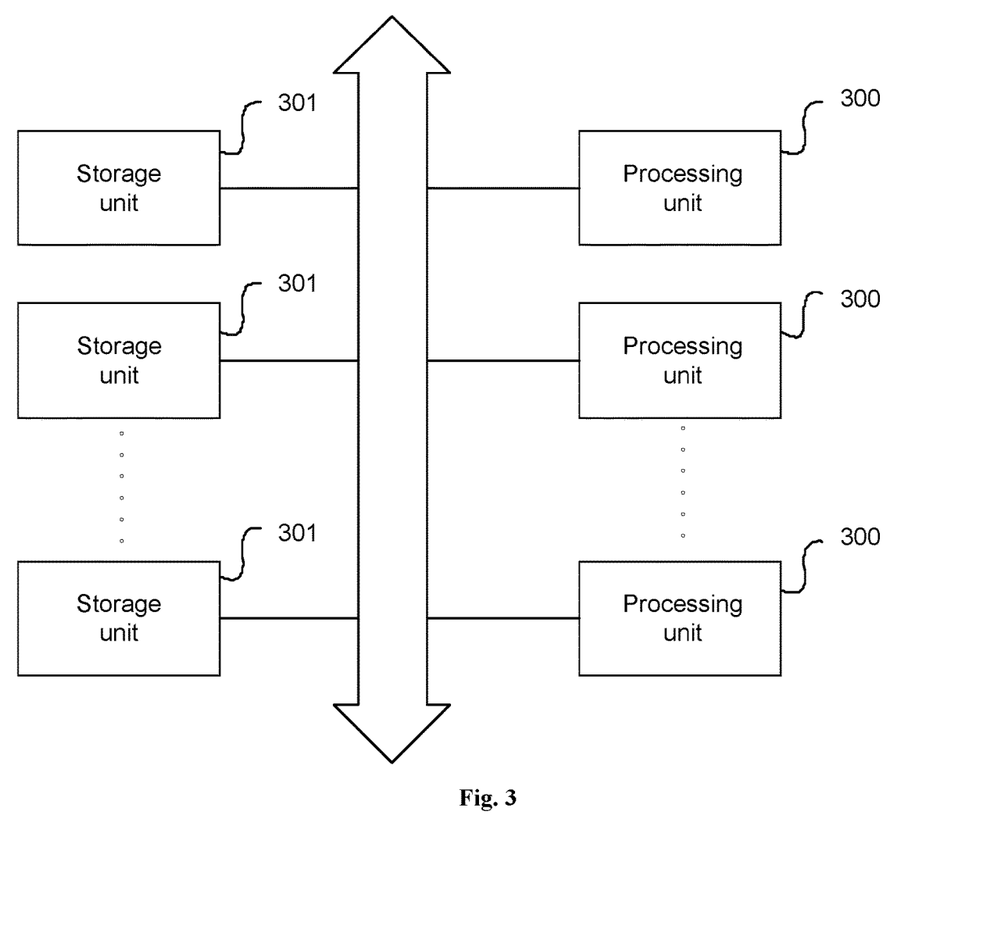
FIG. 3 is a schematic structural diagram of a device for identifying information according to an embodiment of the present disclosure.

As shown in FIG. 3, a device for identifying information according to an embodiment of the present disclosure comprises:

at least one processing unit 300 and at least one storage unit 301, wherein the storage unit 301 is connected to the at least one processing unit 300, and has program codes stored thereon, which when being executed by the processing unit 300, cause the processing unit 300 to: acquire a word vector matrix of the information; for each of a plurality of convolutional kernel widths of a convolutional neural network, convolve each convolutional kernel corresponding to the width with the word vector matrix of the information to acquire a convolutional vector corresponding to each convolutional kernel, and perform a maximum pooling operation on each convolutional vector to acquire an identification feature corresponding to the width; combine identification features corresponding to various convolutional kernel widths to acquire an identification feature of the information; and identify the information according to similarity of the identification feature of the information.

In an embodiment, there are a plurality of different convolutional kernel widths included in the convolutional neural network.

In an embodiment, different convolutional kernel widths correspond to different numbers of convolutional kernels.

In an embodiment, a smaller one of any two widths corresponds to a larger number of convolutional kernels.

In an embodiment, the processing unit 300 is further configured to:

arrange and combine the identification features corresponding to various widths to acquire one-dimensional identification features.

In an embodiment, the similarity of the identification feature of the information comprises first similarity between target information and positive sample information and second similarity between the target information and negative sample information.

In an embodiment, the processing unit 300 is further configured to:

determine a loss value according to the first similarity and the second similarity; and determine whether convolutional neural network parameters in the convolutional neural network need to be adjusted according to the loss value.

In an embodiment, a domain to which the positive sample information belongs is the same as a domain to which the target information belongs, and a domain to which the negative sample information belongs is the same as or different from the domain to which the target information belongs.

Figure 4:
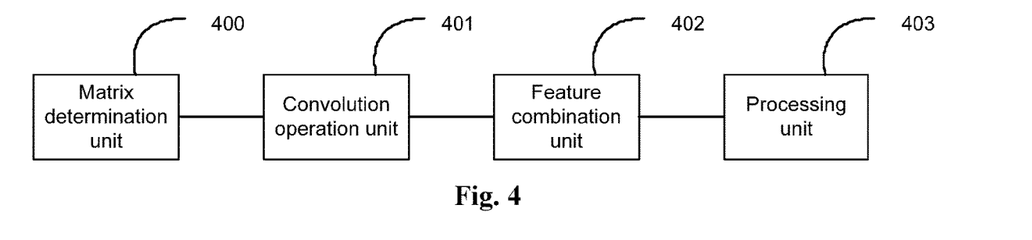
FIG. 4 is a schematic structural diagram of a device for identifying information according to another embodiment of the present disclosure.

As shown in FIG. 4, a device for identifying information according to another embodiment of the present disclosure comprises: a matrix determination unit 400 configured to acquire a word vector matrix of the information; a convolution operation unit 401 configured to, for each of a plurality of convolutional kernel widths of a convolutional neural network, convolve each convolutional kernel corresponding to the width with the word vector matrix of the information to acquire a convolutional vector corresponding to each convolutional kernel, and perform a maximum pooling operation on each convolutional vector to acquire an identification feature corresponding to the width; a feature combination unit 402 configured to combine identification features corresponding to various widths to acquire an identification feature of the information; and a processing unit 403 configured to identify the information according to similarity of the identification feature of the information.

In an embodiment, the information may be any information including words, such as an acquired sentence spoken by a use, or a sentence included in a sample database etc.

In an embodiment, the matrix determination unit 400 is configured to: convert each word in the information into a word vector through an embedding layer and form a word vector matrix using all the word vectors.

In an embodiment, the convolution operation unit 401 is configured to: after the word vector matrix of the information is acquired, convolve each convolutional kernel corresponding to a convolutional kernel width with the word vector matrix; and perform a maximum pooling operation on each convolutional vector, i.e., selecting the largest value in each convolutional vector.

In an embodiment, the feature combination unit 402 is configured to: when the identification features corresponding to various convolutional kernel widths are combined to acquire an identification feature of the information, arrange and combine the identification features corresponding to various convolutional kernel widths to acquire one-dimensional identification features.

In an embodiment, the similarity of the identification feature of the information comprises first similarity between target information and positive sample information and second similarity between the target information and negative sample information.

In an embodiment, the processing unit 403 is further configured to: determine a loss value according to the first similarity and the second similarity; and determine whether convolutional neural network parameters in the convolutional neural network need to be adjusted according to the loss value.

In an embodiment, a domain to which the positive sample information belongs is the same as a domain to which the target information belongs, and a domain to which the negative sample information belongs is the same as or different from the domain to which the target information belongs.

The disclosure is described with reference to the flowcharts and/or block diagrams of the methods, devices (systems) and computer program products according to the embodiments of the disclosure. It should be understood that each flow and/or block in the flowcharts and/or block diagrams as well as a combination of the flows and/or blocks in the flowcharts and/or block diagrams can be implemented by computer program instructions. These computer program instructions can be provided to a processor of a general-purpose computer, a dedicated-purpose computer, an embedded processor, or other programmable data processing devices to generate a machine. Thereby, the instructions executed by the processor of the computer or other programmable data processing devices generate methods for implementing functions specified in one or more flows in the flowcharts and/or one or more blocks in the block diagrams.

These computer program instructions can also be stored in a computer readable memory capable of introducing a computer or other programmable data processing devices to operate in a particular mode. Thereby, the instructions stored in the computer readable memory generate an article of manufacture including instruction means for implementing functions specified in one or more flows in the flowcharts and/or one or more blocks in the block diagrams.

These computer program instructions can also be loaded onto a computer or other programmable data processing devices, so as to enable a series of operation steps to be performed on the computer or other programmable devices to generate a computer-implemented process. Thereby, the instructions executed in the computer or other programmable devices provide a step of implementing functions specified in one or more flows in the flowcharts and/or one or more blocks in the block diagrams.

Although the preferred embodiments of the present disclosure have been described, those skilled in the art can make additional changes and modifications to these embodiments once they learn the basic inventive concept. Therefore, the appended claims are intended to be interpreted as including the preferred embodiments and all changes and modifications which fall within the scope of the present disclosure.

It will be apparent to those skilled in the art that various modifications and variations can be made in the present disclosure without departing from the spirit and scope of the disclosure. In this way, if these modifications and variations of the present disclosure fall within the scope of the claims of the present disclosure and their equivalent technologies, the present disclosure is also intended to include these modifications and variations.

What is claimed is:

1. A method for identifying a sentence, comprising:
    acquiring a word vector matrix of the sentence;
    for each of a plurality of convolutional kernel widths of a convolutional neural network, convolving each convolutional kernel corresponding to the width with the word vector matrix of the sentence to acquire a convolutional vector corresponding to each convolutional kernel, and performing a maximum pooling operation on each convolutional vector to acquire an identification feature corresponding to the width;
    combining identification features corresponding to various convolutional kernel widths to acquire an identification feature of the sentence; and
    identifying the sentence according to similarity of the identification feature of the sentence,
    wherein different convolutional kernel widths correspond to different numbers of convolutional kernels.

2. The method according to claim 1, wherein a smaller one of any two convolutional kernel widths corresponds to a larger number of convolutional kernels.

3. The method according to claim 1, wherein combining identification features corresponding to various convolutional kernel widths to acquire an identification feature of the sentence comprises:
    arranging and combining the identification features corresponding to various convolutional kernel widths to acquire one-dimensional identification features.

4. The method according to claim 1, wherein the similarity of the identification feature of the sentence comprises first similarity between target sentence and positive sample sentence and second similarity between the target sentence and negative sample sentence.

5. The method according to claim 4, wherein identifying the sentence according to similarity of the identification feature of the sentence comprises:
determining a loss value according to the first similarity and the second similarity; and
determining whether convolutional neural network parameters in the convolutional neural network need to be adjusted according to the loss value,
wherein a domain to which the positive sample sentence belongs is the same as a domain to which the target sentence belongs, and a domain to which the negative sample sentence belongs is the same as or different from the domain to which the target sentence belongs.

6. A device for identifying a sentence, comprising:
at least one processing unit; and
at least one storage unit connected to the at least one processing unit, wherein the storage unit has program codes stored thereon, which when being executed by the processing unit, cause the processing unit to:
acquire a word vector matrix of the sentence;
for each of a plurality of convolutional kernel widths of a convolutional neural network, convolve each convolutional kernel corresponding to the width with the word vector matrix of the sentence to acquire a convolutional vector corresponding to each convolutional kernel, and perform a maximum pooling operation on each convolutional vector to acquire an identification feature corresponding to the width;
combine identification features corresponding to various convolutional kernel widths to acquire an identification feature of the sentence; and
identify the sentence according to similarity of the identification feature of the sentence,
wherein different convolutional kernel widths correspond to different numbers of convolutional kernels.

7. The device according to claim 6, wherein a smaller one of any two convolutional kernel widths corresponds to a larger number of convolutional kernels.

8. The device according to claim 6, wherein the processing unit is further configured to:
arrange and combine the identification features corresponding to various convolutional kernel widths to acquire one-dimensional identification features.

9. The device according to claim 6, wherein the similarity of the identification feature of the sentence comprises first similarity between target sentence and positive sample sentence and second similarity between the target sentence and negative sample sentence.

10. The device according to claim 9, wherein the processing unit is further configured to:
determine a loss value according to the first similarity and the second similarity; and
determine whether convolutional neural network parameters in the convolutional neural network need to be adjusted according to the loss value,
wherein a domain to which the positive sample sentence belongs is the same as a domain to which the target sentence belongs, and a domain to which the negative sample sentence belongs is the same as or different from the domain to which the target sentence belongs.

* * * * *